(12) United States Patent
Mishima et al.

(10) Patent No.: US 7,697,407 B2
(45) Date of Patent: Apr. 13, 2010

(54) MULTILAYER OPTICAL RECORDING MEDIUM AND METHOD FOR RECORDING INFORMATION IN MULTILAYER OPTICAL RECORDING MEDIUM

(75) Inventors: Koji Mishima, Tokyo (JP); Takashi Kikukawa, Tokyo (JP); Hidetake Itoh, Tokyo (JP); Daisuke Yoshitoku, Tokyo (JP)

(73) Assignee: TDK Corporation, Tokyo (JP)

( * ) Notice: Subject to any disclaimer, the term of this patent is extended or adjusted under 35 U.S.C. 154(b) by 282 days.

(21) Appl. No.: 11/604,492

(22) Filed: Nov. 27, 2006

(65) Prior Publication Data
US 2007/0121480 A1 May 31, 2007

(30) Foreign Application Priority Data
Nov. 28, 2005 (JP) .............................. 2005-341773

(51) Int. Cl.
*G11B 7/24* (2006.01)
(52) U.S. Cl. .................................. 369/275.5; 369/275.1
(58) Field of Classification Search ................. 369/283, 369/275.5, 275.1, 94
See application file for complete search history.

(56) References Cited

U.S. PATENT DOCUMENTS

| 6,190,750 B1 * | 2/2001 | Wierenga et al. .......... 428/64.1 |
| 6,855,391 B2 * | 2/2005 | Liao et al. ................. 428/64.1 |
| 7,037,565 B2 | 5/2006 | Yamaguchi |
| 2004/0139459 A1 | 7/2004 | Mishima et al. ............. 720/718 |
| 2006/0126484 A1 * | 6/2006 | LeBlanc et al. .......... 369/275.1 |
| 2007/0281080 A1 | 12/2007 | Hayashi et al. |

FOREIGN PATENT DOCUMENTS

| JP | 2001-155380 | 6/2001 |
| JP | 2003141775 A | 5/2003 |
| JP | 200479071 A | 3/2004 |
| JP | 2004-213720 A | 7/2004 |
| JP | 2005149661 A | 6/2005 |
| WO | 0186648 A1 | 11/2001 |

OTHER PUBLICATIONS

Ohara et al., High Density Recording Technology, Mar. 1996, IEEE, p. 355.*
Mishima et al., "Inorganic Write-Once Disc with Quadruple Recording Layers for Blu-ray Disc System", SPIE vol. 5069:90-97 (2003).

* cited by examiner

*Primary Examiner*—Tan X Dinh
(74) *Attorney, Agent, or Firm*—Porzio, Bromberg & Newman, P.C.

(57) ABSTRACT

A multilayer optical recording medium enabled to retain an ideal signal regenerating property in spite of accidental adhesion of finger mark or alien substance is provided. The multilayer optical recording medium 1 is provided with a plurality of information-recording layers 20, 22, 24, and 26 capable of reading information with a reading light irradiated through a light incidence surface 38A on one side and is so adapted that the light incidence side information-recording layer 26 approximating most closely to the light incidence surface 38A may be set at a small recording capacity as compared with the recording capacities of at least one of the other information-recording layers.

9 Claims, 9 Drawing Sheets (A)

(B)

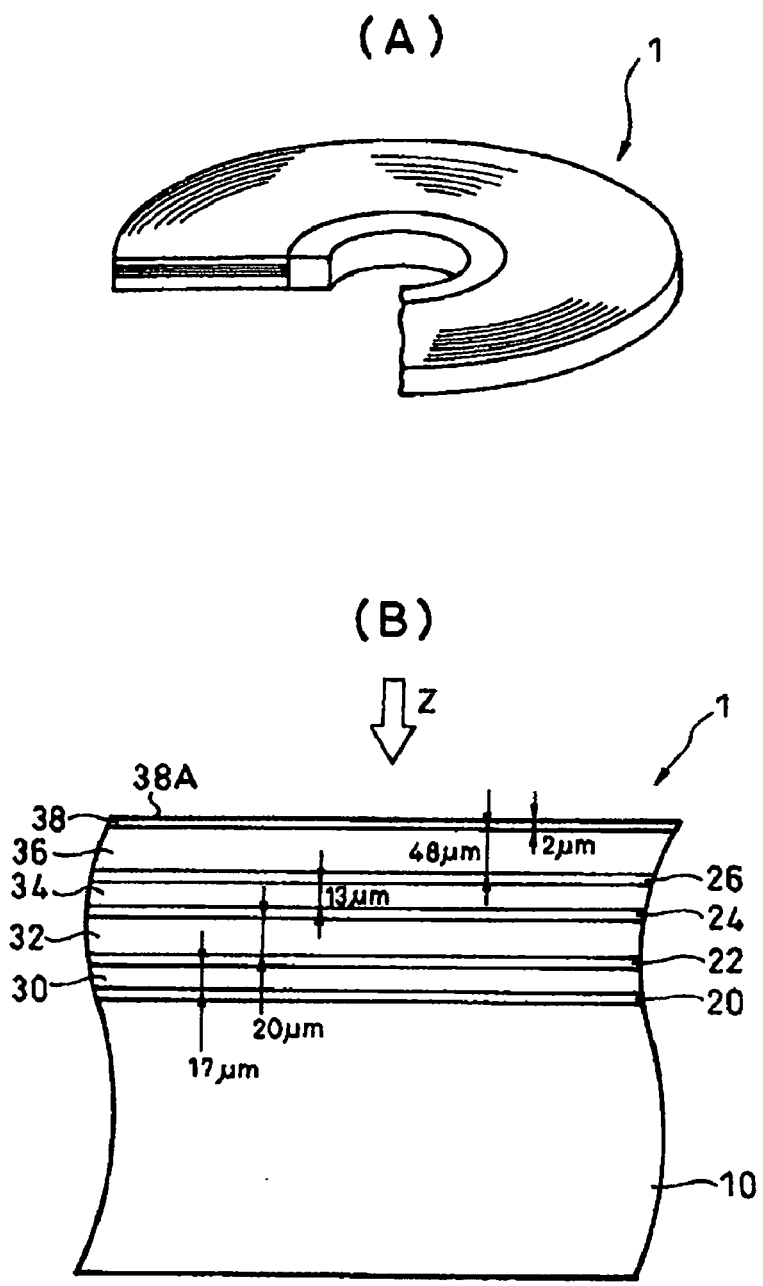
Fig.1(A&B)

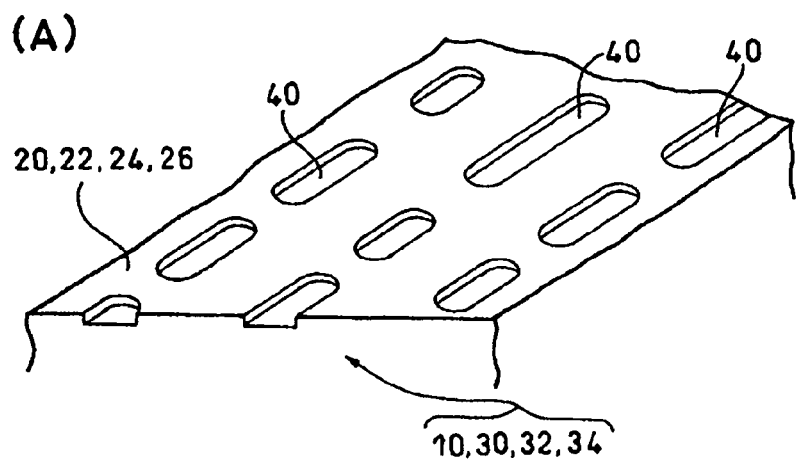
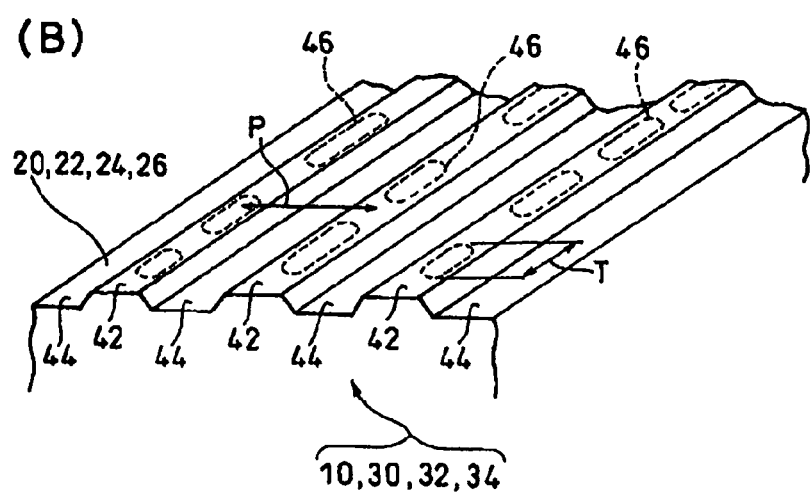
Fig.2(A&B)

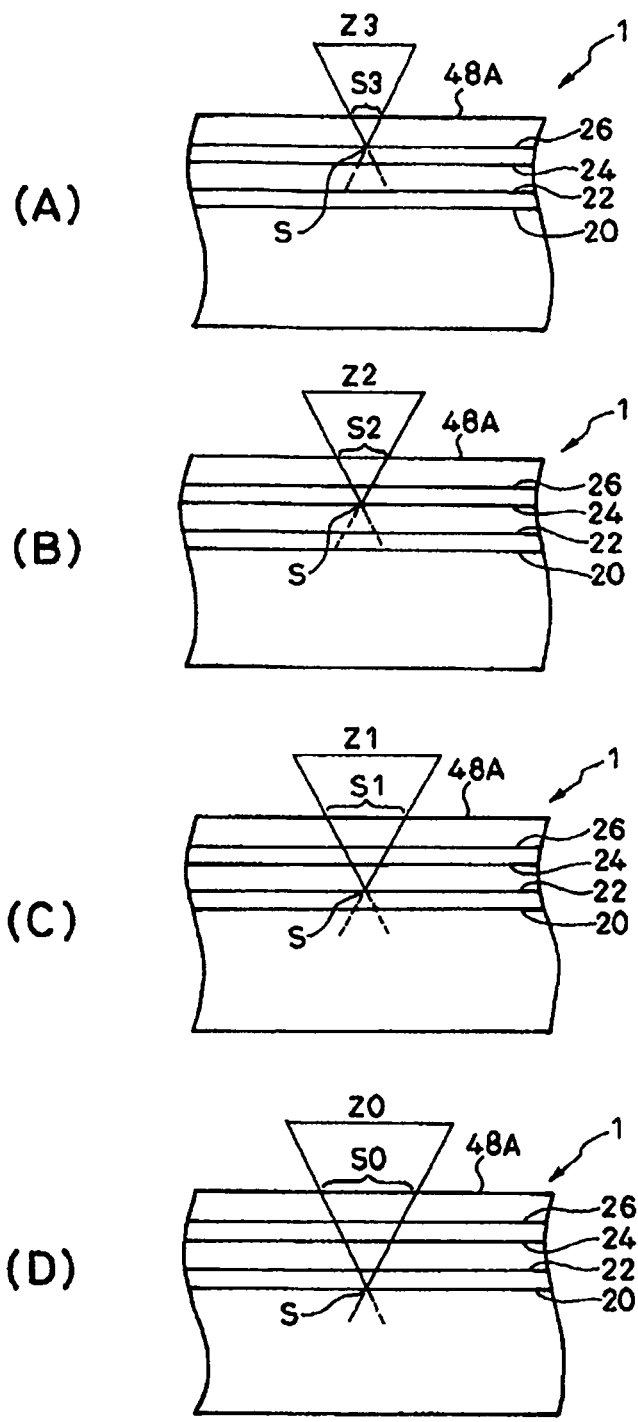
Fig.3(A,B,C&D)

| Thickness of cover layer and hard coat layer ($\mu$m) | 99 | 75 | 65 | 49 | 39 | 34 |
|---|---|---|---|---|---|---|
| attachment of the finger mark | 4.E-06 | 3.E-06 | 3.E-06 | 4.E-06 | 5.E-06 | 6.E-06 |
| bER after attachment of the finger mark | 2.E-05 | 3.2E-04 | 1.E-03 | 2.E-03 | 3.E-03 | 5.E-03 |

|  | recording capacity | bER before attachment of the finger mark | bER after attachment of the finger mark |
|---|---|---|---|
| L3 information-recording layer | 21.5GB | 4.E-06 | 2.E-04 |
| L2 information-recording layer | 23.3GB | 2.E-05 | 7.E-05 |
| L1 information-recording layer | 25GB | 3.E-05 | 3.E-04 |
| L0 information-recording layer | 25GB | 4.E-06 | 4.E-05 |

Fig 6

| | recording capacity | bER before attachment of the finger mark | bER after attachment of the finger mark |
|---|---|---|---|
| L3 information-recording layer | 25GB | 2.E-05 | 4.E-03 |
| L2 information-recording layer | 25GB | 1.E-05 | 1.E-03 |
| L1 information-recording layer | 25GB | 1.E-05 | 3.E-04 |
| L0 information-recording layer | 25GB | 4.E-06 | 4.E-05 |

Fig 7

MULTILAYER OPTICAL RECORDING MEDIUM AND METHOD FOR RECORDING INFORMATION IN MULTILAYER OPTICAL RECORDING MEDIUM

BACKGROUND OF THE INVENTION

1. Field of the Invention

This invention relates to an optical recording medium and more particularly relates to a multilayer optical recording medium having laminated a plurality of information-recording layers and a method for recording information in the multilayer optical recording medium.

2. Description of the Related Art

CD and DVD have been widely utilized to date as optical recording media. The recording capacity required by this kind of optical recording medium has been increasing year after year and various suggestions have been made with a view to satisfying this requirement. In the case of such read-only optical recording media as DVD-Video and DVD-ROM, the versions that increase a recording capacity by the impartation of a double-layer structure to the information-recording layer have been reduced to practice.

An optical recording medium, like the DVD illustrated in FIG. 8, has been being reduced to practice. This medium has two substrates which is configured by digging pits on each surface imparting information-recording layers therein. These two substrates are affixed to each other across an interposed spacer layer in such a manner as to enable the information-recording layers to be opposed to each other.

The DVD of hybrid structure having one information-recording layer formatted in the DVD form and the other information-recording layer formatted in the CD form as illustrated in FIG. 9 has been reduced to practice. In this case, for the reason of being adapted to the specifications for DVD and CD, the information-recording layer to be formatted in the DVD form is set at a depth of 0.6 mm from the light incidence surface and furnished with a capacity of 0.7 GB and the information-recording layer to be formatted in the CD form is set at a depth of 1.2 mm from the light incidence surface and furnished with a capacity of 0.7 GB. For the purpose of reading signals recorded in the two information-recording layers, the DVD player necessitates two kinds of optical systems that differ in wavelength and numerical aperture (NA).

Incidentally, with the object of promoting further increase of the recording capacity, new specifications such as of the Blu-ray Disc have been proposed in recent years. In the Blu-ray Disc, information-recording layers are stacked in the depth of about 0.1 mm from the light incidence surface. These information-recording layers are capable of recording 25 GB of information. In the case of the Blu-ray Disc of two-layer structure, for example, one information-recording layer is formed at a position of 0.075 mm from the light incidence surface and the other at a position of 0.1 mm from the light incidence surface.

The optical recording medium of a large capacity is required to have the diameter of the spot of a laser beam used for recording regenerating data decreased to a small size. Thus, it entails the necessity for enlarging the numerical aperture (NA) of the objective lens for focusing the laser beam and shortening the wavelength of the laser beam as well.

The enlargement of the numerical aperture of the objective lens, however, causes a problem that the tilt margin of the laser beam to the optical recording medium, namely the tolerance of the error in the angle of tilt of the optical axis to the optical recording medium, will become very small. Meanwhile, the decrease of the distance from the light incidence surface of the optical recording medium to the information-recording layer induces an increase in the tilt margin. For the sake of preventing the tilt margin from decreasing while enlarging the numerical aperture of the objective lens, therefore, it is effective to decrease the distance from the light incidence surface to the information-recording layer (namely the thickness of the light-transmitting layer). In the Blu-ray Disc, therefore, the thickness of the light-transmitting layer is supposed to be about 100 μm.

When the light-transmitting layer is set at a small thickness and the information-recording layer is consequently formed at a place near the light incidence surface as in the Blu-ray Disc, however, the problem arises that finger marks, rubbish, etc. are liable to exert a bad influence on the operation of recording and regenerating information. When the information-recording layer is further added to the specification of the Blu-ray Disc, for example, since the information-recording layer must be placed at a distance within 0.1 mm, particularly within 0.75 mm, from the light incidence surface, the problem arises that the finger marks adhering to the surface of the medium exert a still larger influence tending toward deteriorating the signal-regenerating property.

Meanwhile, an effort to increase the distance of the information-recording layer from the light incidence surface as much as possible conversely entails the problem that the individual information-recording layers inevitably suffer from interference of signal because the increased distance results in concentrating a plurality of information-recording layers into the neighborhood of 0.1 mm from the light incidence surface and decreasing the distance between the adjacent information-recording layers.

SUMMARY OF THE INVENTION

This invention relates to a multilayer optical recording medium having laminated a plurality of information-recording layers and aims to enhance the recording regenerating property thereof and add rationally to the recording capacity thereof.

This invention perfected by the present researchers' diligent study directed toward accomplishing the object mentioned above concerns a multilayer optical recording medium comprising a plurality of information-recording layers capable of reading information with a reading light irradiated through a light incidence surface on one side, the improvement characterized by the fact that of the plurality of information-recording layers, the information-recording layer approximating most closely to the light incidence surface is set at a small recording capacity as compared with at least one of the other information-recording layers.

By thus decreasing the recording capacity of the information-recording layer on the light incidence side enables alleviation of the bad influence exerted by finger marks and rubbish adhering to the light incidence surface. Meanwhile, the information-recording layers other than the information-recording layer on the light incidence side are allowed to have their recording capacities set at larger magnitudes. The multilayer optical recording medium as a whole is enabled to acquire an increased recording capacity. Specifically, the recording capacities of all the information-recording layers are not intentionally unified while the information-recording layers capable of reading information from one plane are stratified. That is, by decreasing positively the recording capacity of the information-recording layer on the light incidence side, it is rationally enabled to reconcile the enhancement of the resistance to finger marks and the increase of recording capacity without preparing a plurality of kinds of optical systems.

Further, according to this configuration, since the information-recording layer on the light incidence side is allowed to approximate positively toward the light incidence surface, the interference of signal between the recording layers is enabled to decrease by increasing the distance between the information-recording layers.

The present invention which accomplishes the object mentioned above concerns a multilayer optical recording medium comprising a plurality of information-recording layers capable of reading information with a reading light irradiated through a light incidence surface on one side, the improvement characterized by the fact that of the plurality of information-recording layers, the information-recording layer approximating most closely to the light incidence surface is set at a small recording density as compared with at least one of the other information-recording layers.

By thus decreasing positively the recording density of the information-recording layer on the light incidence side, it is enabled to reconcile the enhancement of the resistance to finger marks and the increase of the recording capacity.

For the purpose of accomplishing the object mentioned above, it is particularly preferable that the information-recording layer approximating most closely to the light incidence surface is set at a small recording density as compared with all other information-recording layers. Since the recording capacity increases on the information-recording layers expect the information-recording layer approximating most closely to the light incidence surface, all the information-recording layers are enabled to increase their total recording capacity.

Further for the purpose of accomplishing the object mentioned above, the information-recording layer approximating most closely to the light incidence surface is preferably set at a small recording density in the linear direction as compared with the recording densities in the linear direction of at least one of the other information-recording layers. By so doing, it is enabled to decrease the ratio of signal error to finger marks, etc. elongated in the direction of recording information and enhance the signal-regenerating property.

For the purpose of accomplishing the object mentioned above, it is preferable that the plurality of information-recording layers are placed within the range of 0.100 mm in the direction of thickness from the light incidence surface. It has been ascertained by the present inventors' study that the information-recording layers positioned within 0.100 mm from the light incidence surface are largely susceptible of the influence of finger marks, etc. on the light incidence surface. This configuration, therefore, is useful for stratifying the relevant layers within the range of 0.100 mm and satisfactorily provides the individual information-recording layers with high recording densities owing to short distances from the light incidence surface.

For the purpose of accomplishing the object mentioned above, the information-recording layer approximating most closely to the light incidence surface is preferably placed within the range of 0.065 mm in the direction of thickness from the light incidence surface.

Further for the purpose of accomplishing the object mentioned above, the number of the information-recording layers to be formed is preferably not less than 3.

The present invention that accomplishes the object mentioned above concerns a multilayer optical recording medium comprising a substrate constituting the surface on one side; a protecting layer constituting the surface on the other side; a plurality of information-recording layers interposed between the substrate and the protecting layer; and spacer layers placed between the information-recording layers, the improvement characterized by the fact that the information-recording layer approximating most closely to the light incidence surface on the surface is set at a small recording capacity as compared with the recording capacities of at least one of the other information-recording layers.

The present invention that accomplishes the object mentioned above concerns a method for recording information in a plurality of information-recording layers incorporate in a multilayer optical recording medium which comprising irradiating the multilayer optical recording with a recording light, the improvement characterized by the fact that the information-recording layer approximating most closely to the light incidence surface for the recording light is adapted to record information at a small recording density as compared with the recording densities of at least one of the other information-recording layers.

This invention, as described above, is capable of manifesting in a multilayer optical recording medium an excellent effect of alleviating the deterioration of the signal-regenerating property due to such extraneous matter as finger marks and increasing the recording capacity.

BRIEF DESCRIPTION OF THE DRAWINGS

The above and other objects, features and advantages of the present invention will become apparent from the following description and appended claims, taken in conjunction with the accompanying drawings.

The above and other objects, features, and advantages of the present invention will become apparent from the following description and appended claims, taken in conjunction with the accompanying drawings.

FIG. 1(A&B) is a perspective view and a magnified cross section illustrating a multilayer optical recording medium to which an example of the mode of embodiment of this invention pertains.

FIG. 2(A&B) is a magnified perspective view illustrating the mode of retaining data in an information-recording layer of the multilayer optical recording medium.

FIG. 3(A,B,C&D) is a cross section illustrating states of regenerating individual information-recording layers of the multilayer optical recording medium.

FIG. 6 is a diagram showing the results of an analysis of the finger mark-resisting property of a working example of the multilayer recording medium.

FIG. 7 is a diagram showing the results of an analysis of the finger mark-resisting property of a comparative example of the multilayer recording medium.

DETAILED DESCRIPTION OF THE PREFERRED EMBODIMENTS

Figure 4:
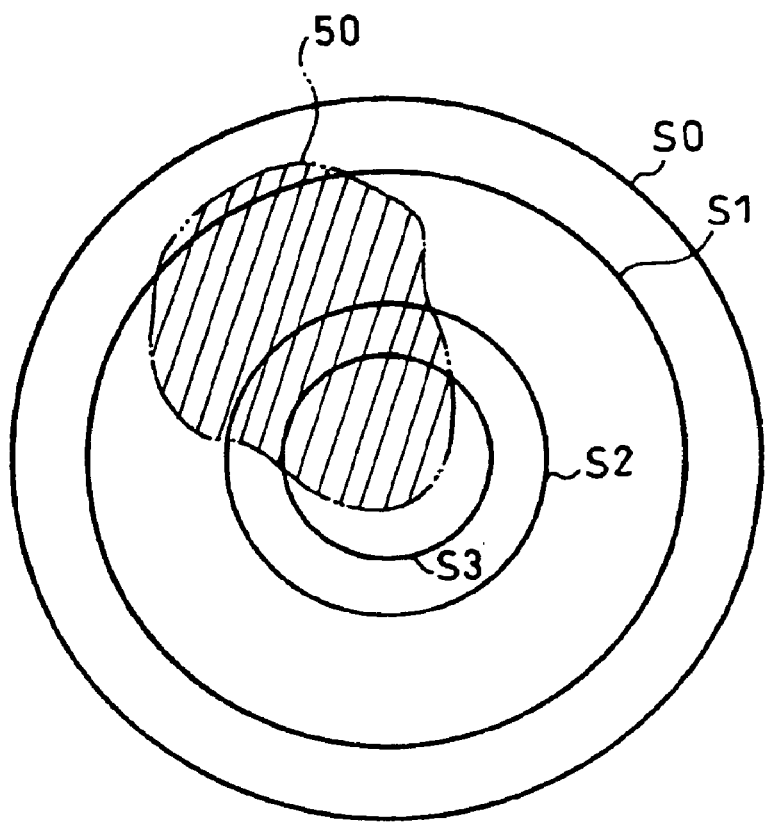
FIG. 4 is a magnified plan view illustrating in type section beam spots formed on and a finger mark attached to the light incidence surface of the multilayer optical recording medium.

Now, the mode of embodying this invention will be described in detail with reference to the drawings.

In FIG. 1(A), a multilayer recording medium 1 to which an embodiment of this invention pertains is illustrated. This multilayer optical recording medium 1 is a disk-shaped medium measuring about 120 mm in outside diameter and about 1.2 mm in thickness. As illustrated in a magnified scale in FIG. 1(B), the multilayer optical recording medium 1 is configured by having a substrate 10, an L0 information-recording layer 20, a first spacer layer 30, an L1 information-recording layer 22, a second spacer layer 32, an L2 information-recording layer 24, a third spacer layer 34, an L3 information-recording layer 26, a cover layer 36, and a hard coat layer 38 stacked sequentially in the order mentioned.

The first spacer layer 30, the second spacer layer 32, the third spacer layer 34, the cover layer 36, and the hard coat layer 38 all possess a light-transmitting property and are adapted to transmit the laser beam irradiated from the outside. A laser beam Z irradiated through a light incidence surface 38A of the hard coat layer 38 can record information in and regenerate information from all the L0/L1/L2/L3 information-recording layers.

The L0 information-recording layer 20 constitutes itself an information-recording layer on the counter-light incidence side separated most from the light incidence surface 38A. Then, the L3 information-recording layer 26 constitutes itself an information-recording layer on the light incidence side approximating most closely to the light incidence surface 38A. In the case of subjecting the L0 information-recording layer 20 to the operation of recording regenerating information, the laser beam Z is made to pass through the L1/L2/L3 information-recording layers 22, 24, and 26 and irradiate the L0 information-recording layer 20. Likewise, in the case of subjecting the L1 information-recording layer 22 to the operation of recording-regenerating information, the laser beam Z2 is made to pass through the L2 and L3 information-recording layers 24 and 26 and irradiate the L1 information-recording layer 22. In the case of subjecting the L2 information-recording layer 24 to the operation of recording-regenerating information, the laser beam is made to pass through the L3 information-recording layer 26 and irradiate the L2 information-recording layer 24. In the case of subjecting the L3 information-recording layer 26 to the operation of recording-regenerating information, the laser beam z is made to irradiate the L3 information-recording layer 26 directly without being passed through the other information-recording layer.

Further, in this multilayer optical recording medium 1, the L3 information-recording layer 26 approximating most closely to the light incidence surface 38A is set at a small recording capacity as compared with any of the L0/L1/L2 information-recording layers 20, 22, and 24. The recording capacity of the L3 information-recording layer 26 is set below about 90% of the largest of the recording capacities of the L0/L1/L2 information-recording layers 20, 22, and 24. Incidentally, in the present embodiment of this invention, it is set near 85%, for example. Specifically, the recording capacity of the L3 information-recording layer 26 is set at 21.5 GB, the recording capacity of the L2 information-recording layer 24 at 23.3 GB, and the recording capacities of the L0 and L1 information-recording layers 20 and 22 are set each at 25 GB. The recording capacities of these information-recording layers, therefore, sequentially decrease in accordance with the distances between the information-recording layers and the light incidence surface 38A. By thus causing the L3 information-recording layer 26 constituting the light incidence side information-recording layer to be set in advance at a small recording capacity as compared with the other information-recording layers, the finger mark-resisting property is improved.

The substrate 10 is a disk-shaped member destined to have a thickness of about 1.1 mm. As the raw material for the substrate 10, various materials such as, glass, ceramic, and resin are available. The present embodiment uses a polycarbonate resin. Besides the polycarbonate resin, olefin resin, acrylic resin, epoxy resin, polystyrene resin, polyethylene resin, polypropylene resin, silicone resin, fluorine-based resin, ABS resin, and urethane resin are also available. Among other resins enumerated above, polycarbonate resin and olefin resin prove to be particularly preferable in terms of ease of processing and molding. On the surface of the substrate 10 on the information-recording layer side, grooves, lands, rows of pits, and the like are formed to suit the purpose of use.

The first spacer layer 30, the second spacer layer 32, and the third spacer layer 34 are interposed between the L0/L1/L2/L3 information-recording layers 20, 22, 24, and 26 and vested with a function of making information-recording layers 20, 22, 24, and 26 become independent. On the light incidence plane of the individual spacer layers 30, 32, and 34, grooves (lands), rows of bits, and the like are formed. Though various materials are usable for the first spacer layer 30, the second spacer layer 32, and the third spacer layer 34, it is necessary that a light-transmitting material be used for these layers with a view to allowing transmission of the laser beam Z as already described. It is also preferable to use an acrylic resin capable of being set with the ultraviolet ray.

In this multilayer optical recording medium 1, the thickness of the first spacer layer 30 is set at 17 μm, the thickness of the second spacer layer 32 at 20 μm, and the thickness of the third spacer layer at 13 μm. By thus varying the thicknesses of the spacer layers 30, 32, and 34, it is made possible to decrease the interference of regenerated signal and decrease the noise of read signal. Incidentally, the thickness of the hard coat layer 38 is set at 2 μm and the thickness of the cover layer 36 at 48 μm.

As a result, in this multilayer optical recording medium 1, the distance from the light incidence surface 38A to the L3 information-recording layer 26 is set at about 50 μm, the distance from the light incidence surface 38A to the L2 information-recording layer 24 at about 63 μm, the distance from the light incidence surface 38A to the L1 information-recording layer 22 at about 83 μm, and the distance from the light incidence surface 38A to the L0 information-recording layer 20 at about 100 μm. The L0 information-recording layer 20, inclusive of the recording capacity (25 GB), is made to conform to the specification of the Blu-ray Disc.

These L0/L1/L2/L3 information-recording layers 20, 22, 24, and 26 are layers for retaining data. The mode of retaining data is known in two kinds, ie the exclusively regenerating type that has data written in advance and allows no rewriting the data and the recording type that allows the user to write in data of his choice. This present embodiment of the invention allows use of either of the types. The recording type as the mode for retaining data more specifically comes in two kinds, ie the write once, read many times (WORM) type that is incapable of writing data again in an area having written in data once and the rewritable type that is capable of erasing data in an area having written data already and rewriting data in the area. This present embodiment of the invention allows free choice between these two types. In the information-recording layers 20, 22, 24, and 26, the modes of retaining data may be mutually varied.

When the data retaining modes of the L0/L1/L2/L3 information-recording layers 20, 22, 24, and 26 belong in the exclusively regenerating type as illustrated in FIG. 2 (A), spiral pit rows 40 are formed on the surface sides of the substrate 10 and the first/second/third spacer layers 30, 32, and 34. The information is retained by these pit rows 40. In this case, reflecting films are formed on the L0/L1/L2/L3 information-recording layers 20, 22, 24, and 26. During the course of the regeneration, the laser beam Z is reflected by the reflecting films of the L0/L1/L2/L3 information-recording layers 20, 22, 24, and 26. The degree of this reflection is varied by the pit rows 40 contacting the individual information-recording layers 20, 22, 24, and 26. The data can be read on the basis of this variation. Incidentally, the L1/L2/L3 information-recording layers 22, 24, and 26 require a high light-transmitting property and their reflecting films therefore require a small thickness. In short, the L1/L2/L3 information-recording layers 22, 24, and 26 are required to possess both the light transmitting property and the light-reflecting property.

When the data retaining modes of the L0/L1/L2/L3 information-recording layers 20, 22, 24, and 26 belong in the recording type as illustrated in FIG. 2 (B), spiral grooves 42 (lands 44) are formed on the surfaces of the substrate 10 and the first/second/third spacer layers 30, 32, and 34. In this case, recording films capable of forming recording marks 46 with the energy of the laser beam Z are formed on the L0/L1/L2/L3 information-recording layers 20, 22, 24, and 26. The grooves 42 function as guide tracks for the laser beam Z during the course of data recording. The recording marks 46 are formed in the information-recording layers 20, 22, 24, and 26 on the grooves 42 by the fact that the intensity of the energy of the laser beam Z advancing severally along the grooves 42 is modulated. Incidentally, when the data retaining mode belongs in the WORM type, the recording marks 46 are irreversibly formed and cannot be erased. Meanwhile, when the data retaining mode belongs in the rewriting type, the recording marks 46 are reversibly formed, erased, and reformed. The recording films are likewise required to possess both the light-transmitting property and the light-reflecting property. Though the case of forming the recording marks 46 on the grooves 42 is illustrated here, the recording marks 46 may be formed on the lands 44 or on both the grooves 42 and the lands 44.

When the information-recording layers 20, 22, 24, and 26 are so stratified as described above, even for the purpose of enabling the laser beam Z of sufficient intensity to reach the L0 information-recording layer 20 most distant from the light incidence surface 38A, the other information-recording layers 22, 24, and 26 are required to possess heightened light-transmitting properties. The present inventors have been ascertained by their study that the degree of light transmission of the L3 information-recording layer 26 approximating most closely to the light incidence surface 38A is preferably set at about 80%.

In the multilayer optical recording medium 1, the L3 information-recording layer 26 that approximates most closely to the light incidence surface 38A is set at a smaller recording capacity than the recording capacities of the L0, L1, and L2 information-recording layers 20, 22, and 24. Further, the L2 information-recording layer 24 that is second nearest to the light incidence surface 38A is set at a recording capacity not more than equal to the recording capacities of the L0 and L1 information-recording layers 20 and 22 farther than the L2 information-recording layer 24. Likewise, the L1 information-recording layer 22 is set at a recording capacity not more than equal to the recording capacity of the L0 information-recording layer 20. By thus increasing stepwise the recording capacities of the information-recording layers in accordance with increasing the distances of these layers from the light incidence surface 38A, it is made possible to improve the signal-regenerating property.

The recording capacities of the individual information-recording layers 20, 22, 24, and 26 are decided by the combination of the size of a recording region (area) and the magnitude of a recording density. In the present embodiment, the recording capacities vary with the recording densities because the recording regions (areas) of the individual recording layers 20, 22, 24, and 26 all coincide. Specifically, the recording densities are decreased by decreasing the linear densities of the individual recording marks 46, namely increasing the lengths T in the spiral direction of the individual recording marks 46 as illustrated in FIG. 2(B). In other words, the recording capacities on the L3 information-recording layer 24 are minimized by maximizing the lengths T in the spiral direction of the individual recording marks 46 of this layer. Incidentally, the lengths T in the spiral direction of the individual recording marks 46 may be optionally expressed as the distances on the medium that can be allocated each to one bit. For the purpose of varying the length T in the spiral direction, the present embodiment of this invention contemplates controlling the linear velocity of the laser beam Z during its advance through the relevant groove, namely the rotational speed of the disc. For example, the recording linear speed is set at 4.9 m/s when the L0 and L1 information-recording layers 20 and 22 are supposed to record information in a volume of 25 GB, the recording linear speed is set at 5.3 m/s when the L2 information-recording layer 24 is supposed to record information in a volume of 23.3 GB, and the recording linear speed is set at 5.7 m/s when the L3 information-recording layer 26 is supposed to record information in a volume of 21.5 GB. By thus varying the rotational speed of the disc, it is made possible to vary the linear density easily without varying the recording time on the laser beam Z. The present embodiment of this invention illustrates the case of varying the linear density. Besides, it is allowable to decrease the recording density by increasing the spiral pitch (distance) P of the spiral pit rows 46 (or grooves 43).

In the case of regenerating the data in the multilayer optical recording medium 1 of this structure, the laser beam Z irradiated through the light incidence surface 38A is caused to form its focal point on any of the L0/L1/L2/L3 information-recording layers 20, 22, 24, and 26. When the data recorded in the L3 information-recording layer 26 is to be regenerated, the focus is so controlled that the beam spot S of the laser beam Z3 may be substantially minimized on the L3 information-recording layer 26 as illustrated in FIG. 3(A). The amount of the laser beam Z3 to be reflected depends on the variation in the degree of light reflection of the L3 information-recording layer 26. The variation of reflected light, therefore, permits detection of the presence of the recording mark and enables regeneration of the data. In this case, an intermediate beam spot S3 larger than the beam spot S is formed on the light incidence surface 38A by the laser beam Z3.

Then, when the data recorded in the L2 information-recording layer 24 is to be regenerated, the focus is so controlled that the beam spot of the laser beam Z2 may be substantially minimized on the L2 information-recording layer 24 as illustrated in FIG. 3 (B). The amount of the laser beam Z2 to be reflected depends on the variation in the degree of light reflection of the L2 information-recording layer 24. The variation of reflected light, therefore, permits detection of the presence of the recording mark and enables regeneration of the data. In this case, an intermediate beam spot S2 larger than the beam spot S is formed on the light incidence surface 38A by the laser beam Z2.

When the data recorded in the L1 information-recording layer 22 is to be regenerated, the focus is so controlled that the beam spot of the laser beam Z1 may be substantially minimized on the L1 information-recording layer 22 as illustrated in FIG. 3(C). The amount of the laser beam Z1 to be reflected depends on the variation in the degree of light reflection of the L1 information-recording layer 22. The variation of reflected light, therefore, permits detection of the presence of the recording mark and enables regeneration of the data. In this case, an intermediate beam spot S1 larger than the beam spot S is formed on the light incidence surface 38A by the laser beam Z1.

When the data recorded in the L0 information-recording layer 20 is to be regenerated, the focus is so controlled that the beam spot of the laser beam Z0 may be substantially minimized on the L0 information-recording layer 20 as illustrated in FIG. 3(D). The amount of the laser beam Z0 to be reflected depends on the variation in the degree of light reflection of the L0 information-recording layer 20. The variation of reflected light, therefore, permits detection of the presence of the recording mark and enables regeneration of the data. In this case, an intermediate beam spot S0 larger than the beam spot S is formed on the light incidence surface 38A by the laser beam Z0.

In FIG. 4, the sizes of the intermediate beam spots S0, S1, S2, and S3 formed on the light incidence surface 38A are compared. Clearly, the intermediate beam spot S3 is smaller than the other beam spots S2, S1, and S0. The intermediate beam spot S2 is smaller than the beam spots S1 and S0. The intermediate beam spot S1 is smaller than the beam spot S0. This is because the focal points (laser spots) part from the light incidence surface 38A in proportion as the distances of the information-recording layers 20, 22, 24, and 26 from the light incidence surface 38A increase.

When the multilayer optical recording medium 1 is carried by its user or inserted into a read-and-write device, such alien substance 50 as finger mark or dust adheres to the light incidence surface 38A. The alien substance 50 causes deterioration of the signal regenerating property of the multilayer optical recording medium 1. The signal property during the course of regeneration is deteriorated in accordance as the ratio of the alien substance 50 to the intermediate beam spots S0,S1,S2, and S3 formed on the light incidence surface 38A increases. Particularly, when the information-recording layers 20, 22, 24, and 26 are positioned within 100 μm from the light incidence surface 38A as in the present embodiment of this invention, the influence of the alien substance 50 grows to a hardly ignorable extent because the sizes of the intermediate beam spots S0,S1,S2, and S3 are extremely small as compared with the sizes of the conventional CD and DVD wherein the distances from the light incidence surfaces to the information-recording layers exceed 600 μm. The present inventors have been ascertained by their study that the influence of the alien substance 50 sharply increases when the distance from the light incidence surface 38A to the information-recording layer falls within 100 μm, particularly within 75 μm, and more particularly within 65 μm.

In this multilayer optical recording medium 1, the L3 information-recording layer 26 approximating most closely to the light incidence surface 38A has the recording capacity set at a smaller magnitude than any of the other information-recording layers 20, 22, and 24. Decreasing the recording capacity results in enlarging the length of the recording mark or pit and enlarging the spiral pitch of the grooves or the rows of pits and, consequently, enables substantial decrease of the influence of the noise of the regeneration signal. Since the bit error rate of the regeneration signal is decreased and the correction of the regeneration error in the L3 information-recording layer 26 is facilitated as a result, the homogenization of the regeneration property of this layer 26 with the regeneration properties of the other information-recording layers 20, 22, and 24 is promoted. It is further made possible to form a new information-recording layer even at a distance within 100 μm, particularly within 65 μm, from the light incidence surface 38A and realize further stratification on the surface side of the medium and add to the recording capacity while the information-receiving layers in the neighborhood of 100 μm are enabled to conform to the specification of the Blu-ray Disc.

Figure 5:
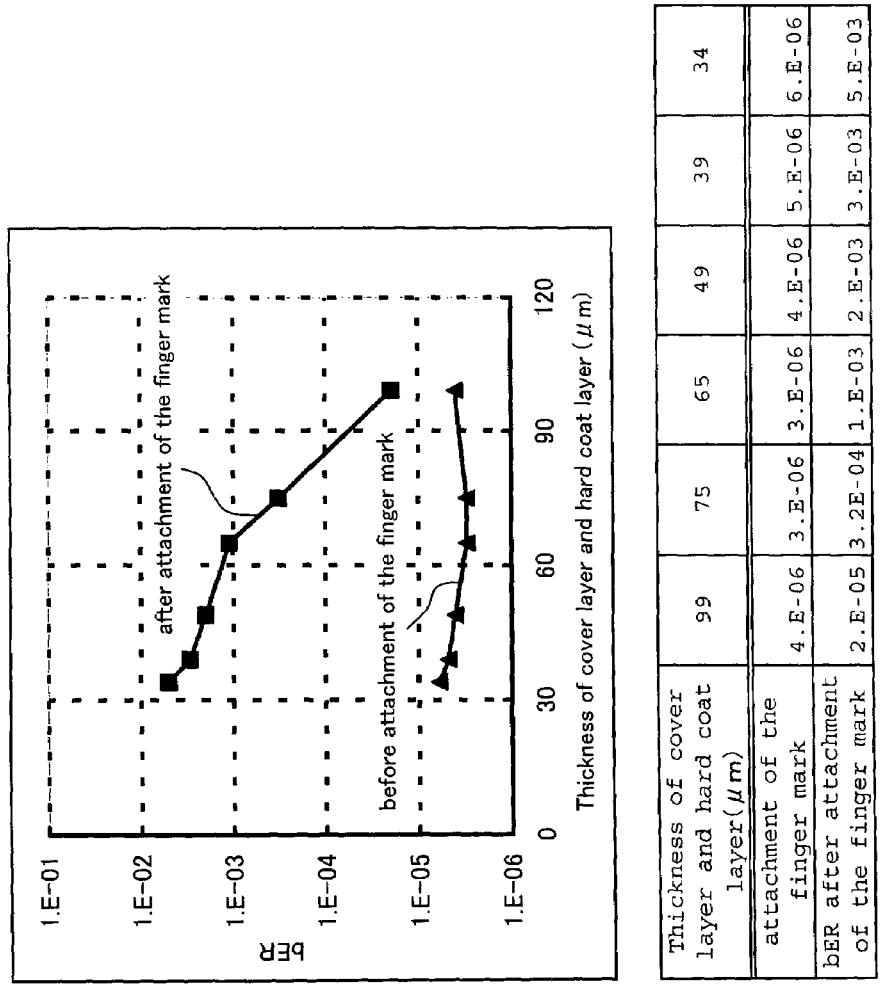
FIG. 5 is a diagram showing the results of an analysis of the relation between the positions of the information-recording layers of the optical recording medium and the property of resisting finger marks.
Figure 8:
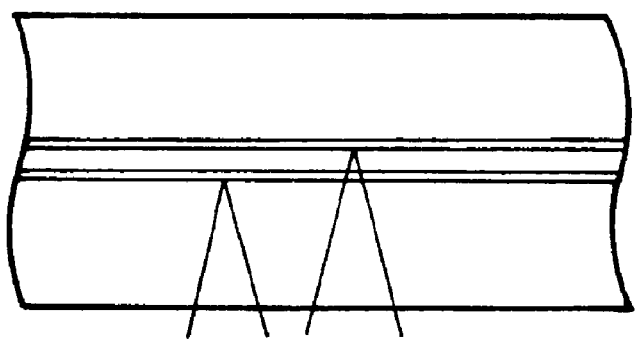
FIG. 8 is across section illustrating in type section the structure of a conventional DVD.
Figure 9:
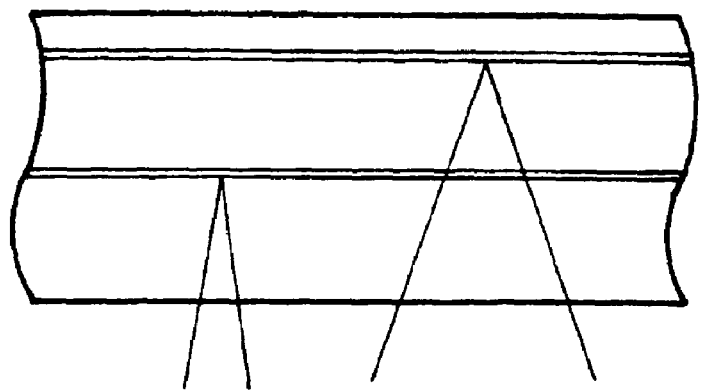
FIG. 9 is across section illustrating in type section the structure of a conventional hybrid DVD.

[Results of Analysis for Reference] FIG. 5 shows the results of an investigation conducted into the change of the bit error rate (bER) caused by the presence of an alien substance such as finger mark when the distance from the light incidence surface to the information-recording layer approximating most closely to the light incidence surface 38A (the light incidence side information-recording layer) is varied in the optical recording medium. Incidentally, the distance from the light incidence surface to the information-recording layer on the light incidence side was adjusted by varying the thickness of the cover layer and all the information-recording layers were made to possess a common recording capacity. The information-recording layers were each formed in a thickness of 48 nm and composed of bismuth (Bi), oxygen (O), and germanium (Ge) at a composition ratio (atm %) of Bi:O:Ge=23:68:9. The bit error rate (bER) signifies the ratio of the error bit number to the prescribed bit number and serves as a numerical value to indicate how many errors are contained in a given digital signal information being regenerated. Generally, when the bER exceeds $10^{-3}$, the correction of error becomes difficult even when the signal is allowed redundancy.

As a result of an analysis conducted by the present inventors, it has become clear that when the distance from the light incidence surface to the light incidence side information-recording layer 26 falls within 75 μm, particularly within 65 μm, the bER is sharply increased by the influence of the adhesion of a finger mark and is made readily to exceed $10^{-3}$. This analysis means that if the light incidence side information-recording layer approximates closely to the light incidence surface, the signal-regenerating property will be sharply deteriorated after all and the stratification will be rendered difficult to effect unless Some solutions are adopted.

[Example]A working example of the actual production of the multilayer optical recording medium 1 that embodies this invention will be shown below. This invention is not limited in any sense to this working example.

[Preparation of Sample Medium] First, a substrate 10 was produced by the injection molding method. On the surface of the substrate 10, a spiral groove was formed with a track pitch of 0.32 μm. The substrate 10 used polycarbonate resin as its raw material and set its thickness at 1.1 mm and its diameter at 120 mm.

Then, this substrate 10 was set on a sputtering device and was caused to form on its surface with the groove an L0 information-recording layer 20 in a prospective thickness of 48 nm. Specifically, the L0 information-recording layer 20 was composed of bismuth (Bi), oxygen (O), and germanium (Ge) at a composition ratio (atm %) of Bi:O:Ge=29:70:1.

Subsequently, the substrate 10 that had the L0 information-recording layer 20 formed thereon was set on a spin coating device and subjected to spin coating which was implemented by causing an acryl-based ultraviolet-setting resin to fall in drops onto the substrate while keeping the substrate in rotation. Thereafter, a light-transmitting stamper furnished with a spiral groove pattern was pressed against the surface of a resin coat deposited by the spin coating and the resin coat was hardened by exposure to ultraviolet light via the light-transmitting stamper. By removing the light-transmitting stamper after the resin coat had been hardened, a first spacer layer 30 provided with a spiral groove (having a track pitch of 0.32 µm) and measuring 17 µm in thickness was completed.

An L1 information-recording layer 22 was formed on the first spacer layer 30 by following the same procedure as used for the formation of the L0 information-recording layer 20 while changing the composition ratio of bismuth (Bi), oxygen (O), and germanium (Ge) (atm %), to Bi:O:Ge=25:71:4 and changing the thickness to 62 nm.

Further, a second spacer layer 32 was formed on the L1 information-recording layer 22 by following the same procedure as used for the formation of the first spacer layer 30 while setting the thickness of the second spacer layer 32 at 20 µm. Then, on the second spacer layer 32, an L2 information-recording layer 24 having a thickness of 68 nm and composed of bismuth (Bi), oxygen (O), and germanium (Ge) at a composition ratio (atm %) of Bi:O:Ge=25:68:7 was formed. A third spacer layer 34 having a thickness of 12 µm was formed thereon. Further, on the third spacer layer 34, an L3 information-recording layer 26 measuring 73 nm in thickness and composed of bismuth (Bi), oxygen (O), and germanium (Ge) at a composition ratio (atm %) of Bi:O:Ge=23:68:9 was formed.

The substrate 10 that had the L3 information-recording layer 26 formed thereon was set on a spin coating device and subjected to spin coating which was implemented by causing an acryl-based ultraviolet-setting resin to fall in drops onto the substrate while keeping the substrate in rotation. The coat consequently formed was exposed to ultraviolet light to complete a cover layer 36 having a thickness of 48 µm.

The cover layer 36 was coated with an ultraviolet/electron beam-setting hard coat agent by the spin coating method. The coat consequently formed was heated in the atmosphere for 3 minutes to expel the diluting solvent from the interior of the coat and produce an uncured hard coat material layer. This uncured hard coat material layer was coated with a surface material solution by the spin coating method. Incidentally, this surface material solution was prepared by having a fluorine-based solvent (99.5 weight parts) add perfluoropolyether diacrylate (0.33 weight part, molecular weight: about 2000) and 3-perfluorooctyl-2-hydroxypropyl acrylate (0.17 weight part). Thereafter, the hard coat material layer was dried at 60° C. for 3 minutes and further exposed to an electron ray in a current of nitrogen to harden simultaneously the hard coat material layer and the surface material solution and complete a hard coat layer 38. For the exposure to the electron ray, an electron beam radiating device (made by Nisshin High-Voltage K.K. and sold under the trademark designation of "Curetron") was adopted and operated at an electron beam acceleration voltage of 200 kV and an irradiation dose of 5 Mrad. Thus, the multilayer optical recording medium 1 was obtained.

[Evaluation of Sample Medium] In the L0/L1/L2/L3 information-recording layers 20, 22, 24, and 26 of this multilayer optical recording medium 1, sample data formed by optionally repeating the binary digits "0" and "1" were recorded. On this occasion, the L0 and L1 information-recording layers 20 and 22 had their whole recording capacities set each at 25 GB and were made to implement the recording with their recording densities (lengths of recording marks) adjusted in conformity with the recording capacities. The L2 information-recording layer 24 had its whole recording capacity set at 23.3 GB and was made to implement the recording with its recording density adjusted in conformity with the recording capacity. Then, the L3 information-recording layer 26 had its whole recording capacity set at 21.5 GB and was made to implement the recording with its recording density adjusted in conformity with the recording capacity. The L3 information-recording layer 26 acquired the largest recording mark, the L2 information-recording layer the second largest recording mark, and the L0 and L1 information-recording layers the smallest recording mark.

FIG. 6 shows the results of an evaluation of the signal regenerating property of the multilayer optical recording medium 1 which completed recording data in the absence of alien substance 50 on the light incidence surface 38A. In the evaluation of the regenerating property, the product of PARUSUTEKKU Kogyo K.K. sold under the trademark designation of "OPU-1000" was used for the determination of the bit error rate (bER). In all the L0/L1/L2/L3 information-recording layers 20, 22, 24, and 26, the bit rate errors (bER) were invariably not more than $10^{-3}$. This fact clearly indicates that the multilayer optical recording medium 1 possessed a good signal regenerating property.

Then, an artificial finger mark was attached to the light incidence surface 38A of the multilayer optical recording medium 1 which completed recording data. The procedure for the attachment of the finger mark consisted of first preparing the raw materials for the artificial finger mark. These raw materials were composed of Kanto loam (0.4 weight part), triolein (1 weight part) functioning as a dispersing medium, and methoxypropanol (10 weight parts) functioning as a diluting agent. Kanto loam was a testing powder Type 11 (intermediate diameter: 1.6~2.3 µm) expected to function as fine powder and specified in JIS (Japanese Industrial Standard) Z8901. These raw materials were mixed and consequently forming an artificial finger mark liquid.

Then, an original form to be used for transferring a dummy finger mark pattern was manufactured. To be specific, the artificial finger mark liquid was thoroughly stirred in a magnetic stirrer. About 1 mL of the stirred liquid was collected and applied by the spin coating method to a substrate (measuring 120 mm in diameter and 1.2 mm in thickness) made of polycarbonate. This substrate was heated at 60° C. for 3 minutes for thorough removal of the unnecessary diluting agent, methoxypropanol. Thus, the original plate to be used for transferring the dummy finger mark pattern was obtained.

Further, a dummy finger mark transfer material (so-called dummy finger tip) was made by uniformly polishing the smaller end face of a No. 1 silicone rubber stopper (diameter 12 mm) with a #240 abrasive paper (equivalent in performance to AA240 abrasive paper specified by JIS). The polished end face of this dummy finger mark transfer material was pressed on the original plate under a load of 4.9 N continuously for 10 seconds to induce transfer of the artificial finger mark liquid component to the end face of the transfer material. For the purpose of decreasing in advance the amount of the artificial finger mark liquid component adhering to the end face, the operation of pressing the end face of the transfer material was pressed on another polycarbonate substrate three times under a load of 4.9 N continuously for 10 seconds at different portions.

The end face of the dummy finger mark transfer material thus prepared was pressed on the light incidence surface 38A of the hard coat layer 38 of the multilayer optical recording medium 1 in the neighborhood of 40 mm in the radial direction from the center under a load of 29 N continuously for 10 seconds to allow transfer of the artificial finger mark liquid component to the light incidence surface 38A. The transferred liquid component was used as an artificial finger mark.

In FIG. 6 that was already used for reference, the results of an evaluation of the signal regenerating property of the multilayer optical recording medium 1 in the presence of an adhering artificial finger mark (alien substance 50) are also shown. The results indicate that the L3 information-recording layer 26 possessed an excellent signal regenerating property as evinced by the fact that it only revealed a bit error rate (bER) of $2\times10^{-4}$ in spite of its approximation to a distance of about 50 μm from the light incidence surface 38A. The L2 information-recording layer 24 positioned at a distance of about 63 μm from the light incidence surface 38A proved likewise to possess an excellent signal regenerating property by revealing a bit error rate (bER) of $7\times10^{-5}$. The results make it clear that even the multilayer optical recording medium having a four-layer structure and having a plurality of information-recording layers exist within 100 μm from the surface is capable of securing a sufficient finger mark resistance.

[Comparative Experiment for Evaluation] For a comparative example, a multilayer optical recording medium was produced by following the same procedure as used for the sample medium and all the L0/L1/L2/L3 information-recording layers were all made to record information in a volume of 25 GB. Incidentally, the attachment of a finger mark was implemented by following completely the same procedure as adopted for the sample medium.

FIG. 7 shows the results of an evaluation of the signal regenerating property of comparative example before and after the attachment of the finger mark. Before the attachment of the finger mark, all the information-recording layers proved to possess a satisfactory property by revealing a bER of not more than $2\times10^{-5}$. After the attachment of the artificial finger mark, the L3 information-recording layer and the L2 information-recording layer proved to suffer deterioration of the signal regenerating property by revealing bER's respectively of $4\times10^{-3}$ and $1\times10^{-3}$.

It is clear from the foregoing working example that the multilayer optical recording medium 1 conforming to the mode of embodiment of this invention is enabled to enhance the finger mark resistance by setting the L3 information-recording layer 26 approximating most closely to the light incidence surface 38A at a small recording capacity. For example, when the memory capacity of the L3 information-recording layer 26 is set at not more than 90%, preferably at about 85%, of the recording capacity (25 GB) of the L0, L1 information-recording layers 20, 21, the multilayer optical recording medium is enabled to enhance the finger mark resistance and all the information-recording layers are enabled to acquire high recording capacities. The sample medium mentioned above is supposed to acquire a recording capacity of 94.8 GB. In short, the enhancement of the finger mark resistance and the increase of the recording capacity can be rationally reconciled simply by giving the information-recording layer approximating closely to the light incidence surface 38A a slightly smaller recording capacity than the other information-recording layers.

Further, in this multilayer optical recording medium 1, not less than three, preferably not less than four information-recording layers can be stacked within an extremely narrow range of about 100 μm from the light incidence surface 38A. That is, these information-recording layers are enabled to share the light source (pickup) on the recording regenerating device and the cost of production of the recording-regenerating device is allowed to decrease.

Further, this multilayer optical recording medium 1 is enabled to decrease the noise component of the signal because the first, second, and third spacer layers 30, 32, and 34 are made to differ mutually in thickness and the interference among the individual information-recording layers 20, 22, 24, and 26 is consequently decreased. By varying both the recording capacity and the intervening distance between the adjacent information-recording layers 20, 22, 24, and 26 (particularly the information-recording layers approximating closely to the light incidence surface 38A), therefore, the signal-regenerating property can be synergistically enhanced.

Though the multilayer optical recording medium has been illustrated in the present embodiment by sole reference to the case of using four information-recording layers, this invention does not need to limit the number of information-recording layers to 4 but may change it to 2 or 3 or to 5 or more. While the present embodiment has been described by sole reference to the case of having all the four information-recording layers stacked within 100 μm from the light incidence surface, this invention does not need to observe strictly this range but may allow the range to exceed 100 μm. Part of the plurality of stacked information-recording layers may properly occur at a position surpassing the range of 100 μm.

While the present embodiment has been described by sole-reference to the case of decreasing the capacity of recording information by decreasing the density of information in the linear direction (the longitudinal direction of groove), this invention does not need to be restricted to the method of this case but may use other method for adjusting the capacity of recording. The adjustment optionally may be accomplished by decreasing the area of recording of the information-recording layer approximating most closely to the light incidence surface. As regards the prescribed range directed from the outer peripheral edge of a disk-shaped multilayer optical recording medium toward the center thereof, for example, it is preferred to constitute a non-recording region in the information-recording layer approximating most closely to the light incidence surface. Doing so enables avoidance of the deterioration of the signal regenerating property of the multilayer optical recording medium because no information is recorded in the information-recording layer approximating most closely to the light incidence surface even when a finger mark happens to adhere to the neighborhood of the outer periphery of this multilayer optical recording medium as when the medium is handled.

Incidentally, the multilayer optical recording medium of this invention does not need to be limited to the mode of embodiment described above but may be altered diversely without departure from the spirit of this invention. This invention, in a varying multilayer optical recording medium adapted to retain data, enables decreasing deterioration of the signal properties caused by an alien substance adhering to the surface of the medium.

The entire disclosure of Japanese Patent Application No.2005-341773 filed on Nov. 28, 2006 including specification, claims, drawings, and summary are incorporated herein by reference in its entirety.

What is claimed is:

1. A multilayer optical recording medium comprising a plurality of information-recording layers capable of reading information with a reading light irradiated through a light incidence surface on one side and the information-recording layer approximating most closely to the light incidence surface is placed within the range of 0.065 mm in the direction of thickness from the light incidence surface, wherein of the plurality of information-recording layers, the information-recording layer approximating most closely to the light incidence surface is set at a small recording capacity as compared with at least one of the other information-recording layers wherein the information-recording layer approximating most closely to the light incidence surface has a recording region set at a smaller area than the recording regions of at least one of the other information-recording layers.

2. The multilayer optical recording medium according to claim 1, wherein the plurality of information-recording layers are placed within the range of 0.100 mm in the direction of thickness from the light incidence surface.

3. The multilayer optical recording medium according to claim 1, wherein the number of information-recording layers to be formed in the medium is not less than 3.

4. A multilayer optical recording medium comprising a plurality of information-recording layers capable of reading information with a reading light irradiated through a light incidence surface on one side and the information-recording layer approximating most closely to the light incidence surface is placed within the range of 0.065 mm in the direction of thickness from the light incidence surface, wherein of the plurality of information-recording layers, the information-recording layer approximating most closely to the light incidence surface is set at a small recording density as compared with all other information-recording layers.

5. The multilayer optical recording medium according to claim 4, wherein the information-recording layer approximating most closely to the light incidence surface is set at a small recording density in the liner direction as compared with the recording densities in the linear direction of at least one of the other information-recording layers.

6. The multilayer optical recording medium according to claim 4, wherein the plurality of information-recording layers are placed within the range of 0.100 mm in the direction of thickness from the light incidence surface.

7. The multilayer optical recording medium according to claim 4, wherein the number of information-recording layers to be formed in the medium is not less than 3.

8. A multilayer optical recording medium comprising a substrate constituting the surface on one side; a protecting layer constituting the surface on the other side; a plurality of information-recording layers interposed between the substrate and the protecting layer; and spacer layers placed between the information-recording layers and the information-recording layer approximating most closely to the light incidence surface is placed within the range of 0.065 mm in the direction of thickness from the light incidence surface, wherein the information-recording layer approximating most closely to the light incidence surface on the surface is set at a small recording capacity as compared with the recording capacities of at least one of the other information-recording layers.

9. A method for recording information in a plurality of information-recording layers incorporate in a multilayer optical recording medium which comprising irradiating the multilayer optical recording with a recording light and the information-recording layer approximating most closely to the light incidence surface is placed within the range of 0.065 mm in the direction of thickness from the light incidence surface, wherein the information-recording layer approximating most closely to the light incidence surface for the recording light is adapted to record information at a small recording density as compared with the recording densities of at least one of the other information-recording layers.

* * * * *